United States Patent
Kroll

(10) Patent No.: US 8,005,474 B2
(45) Date of Patent: Aug. 23, 2011

(54) CELL PHONE LOCATOR METHOD

(75) Inventor: Mark W. Kroll, Crystal Bay, MN (US)

(73) Assignee: Kroll Family Trust, Crystal Bay, MN (US)

( * ) Notice: Subject to any disclaimer, the term of this patent is extended or adjusted under 35 U.S.C. 154(b) by 493 days.

(21) Appl. No.: 12/258,903

(22) Filed: Oct. 27, 2008

(65) Prior Publication Data

US 2010/0029256 A1  Feb. 4, 2010

Related U.S. Application Data

(63) Continuation-in-part of application No. 10/414,733, filed on Apr. 15, 2003, now Pat. No. 7,444,154, which is a continuation-in-part of application No. 09/406,067, filed on Sep. 24, 1999, now Pat. No. 6,580,915.

(51) Int. Cl.
    *H04Q 7/20* (2006.01)
(52) U.S. Cl. ............... 455/431; 379/35; 379/32.01
(58) Field of Classification Search ........... 379/35, 379/32.01, 133; 455/431
    See application file for complete search history.

(56) References Cited

U.S. PATENT DOCUMENTS

| | | | |
|---|---|---|---|
| 3,800,231 A | 3/1974 | Pratt | |
| 4,352,200 A | 9/1982 | Oxman | |
| 4,486,807 A | 12/1984 | Yanez | |
| 4,716,417 A | 12/1987 | Grumet | |
| 5,230,085 A | 7/1993 | Loposer | |
| 5,343,493 A | 8/1994 | Karimullah | |
| 5,388,603 A | 2/1995 | Bauer | |
| 5,429,301 A | 7/1995 | Franks | |
| 5,444,762 A | 8/1995 | Frey et al. | |
| 5,476,192 A | 12/1995 | Julinot | |
| 5,512,908 A | 4/1996 | Herrick | |
| 5,625,364 A | 4/1997 | Herrick et al. | |
| 5,670,742 A | 9/1997 | Jones | |
| 5,678,200 A | 10/1997 | Levi | |
| 5,684,861 A | 11/1997 | Lewis et al. | |
| 5,740,234 A * | 4/1998 | Black et al. | 379/112.01 |
| 5,742,666 A | 4/1998 | Alpert | |
| 5,781,114 A | 7/1998 | Chang | |
| 5,786,546 A | 7/1998 | Simson | |
| 5,856,803 A | 1/1999 | Pevler | |
| 5,873,040 A | 2/1999 | Dunn | |
| 5,877,630 A | 3/1999 | Kraz | |
| 5,883,598 A | 3/1999 | Parl et al. | |
| 5,887,258 A | 3/1999 | Lemozit et al. | |
| 5,901,206 A | 5/1999 | Soon | |
| 5,920,278 A | 7/1999 | Tyler et al. | |
| 5,986,872 A | 11/1999 | Chaput | |
| 5,988,450 A | 11/1999 | Cassarino | |
| 6,052,051 A | 4/2000 | Whalen | |
| 6,052,604 A | 4/2000 | Bishop et al. | |
| 6,148,219 A | 11/2000 | Engelbrecht et al. | |
| 6,212,392 B1 | 4/2001 | Fitch et al. | |
| 6,233,459 B1 | 5/2001 | Sullivan et al. | |
| 6,236,359 B1 | 5/2001 | Watters et al. | |

(Continued)

*Primary Examiner* — Creighton Smith
(74) *Attorney, Agent, or Firm* — Vidas, Arrett & Steinkraus

(57) ABSTRACT

A method of locating a cellular phone on an aircraft includes detecting a cellular phone transmission of a passenger on an aircraft, logging a subscriber number and a serial number of the phone, transmitting the subscriber number and the serial number of the phone to a common carrier for caller identification information, attempting to match the caller identification information with a database, displaying a name and a seat number of the passenger if a match was found between the caller identification information and the database, and recording all information related to the cellular phone transmission.

19 Claims, 15 Drawing Sheets

U.S. PATENT DOCUMENTS

| | | |
|---|---|---|
| 6,246,675 B1 | 6/2001 | Beasley et al. |
| 6,246,884 B1 | 6/2001 | Karmi et al. |
| 6,254,249 B1 | 7/2001 | Kim et al. |
| 6,269,243 B1 | 7/2001 | Corbefin et al. |
| 6,314,286 B1 | 11/2001 | Zicker |
| 6,321,092 B1 | 11/2001 | Fitch et al. |
| 6,456,822 B1 | 9/2002 | Gofman et al. |
| 2001/0016491 A1* | 8/2001 | Imura et al. ............ 455/432 |
| 2001/0053698 A1 | 12/2001 | Karmi et al. |
| 2004/0018845 A1 | 1/2004 | Kroll |
| 2004/0169587 A1* | 9/2004 | Washington ............ 340/573.1 |
| 2004/0203582 A1* | 10/2004 | Dorenbosch et al. ...... 455/406 |
| 2006/0009192 A1* | 1/2006 | Radpour ................ 455/404.2 |
| 2007/0130599 A1* | 6/2007 | Monroe .................... 725/105 |
| 2007/0264999 A1* | 11/2007 | Radpour .................. 455/431 |
| 2008/0057924 A1* | 3/2008 | Stewart .................. 455/414.3 |
| 2008/0285464 A1* | 11/2008 | Katzir ..................... 370/241 |
| 2009/0016526 A1* | 1/2009 | Fiatal et al. ............... 380/255 |

* cited by examiner

CELL PHONE LOCATOR METHOD

CROSS-REFERENCE TO RELATED APPLICATIONS

This application is a continuation-in-part of U.S. patent application Ser. No. 10/414,733, filed Apr. 15, 2003 and issuing as U.S. Pat. No. 7,444,154, which is a continuation-in-part of U.S. patent application Ser. No. 09/406,067, filed Sep. 24, 1999, now issued U.S. Pat. No. 6,580,915, the entire contents of each being expressly incorporated herein by reference.

STATEMENT REGARDING FEDERALLY SPONSORED RESEARCH

Not Applicable

BACKGROUND OF THE INVENTION

Hand-held cellular phones have caused significant interference with navigation systems in commercial aircraft. While the power level on a cellular phone may be adjusted down to as low as six milliwatts for perfect connections, the power output can rise to as much as 2 watts. A hazard nearly as important in preventing that of interference with aircraft navigation is the potential paralysis of the ground-base cellular system. The ground-base cellular system is designed for people driving or moving slowly on the ground and assumes that each user is only able to communicate with a handful of antennas. These antenna locations then agree which one has the strongest signal from the user and then carry the communication. An individual in an aircraft flying over a city could literally tie up one channel each in over a hundred antennas and this could cause a great deal of inefficiency and near paralysis in the ground cellular system. For this reason, and for the concern about aircraft navigation, it is a violation of federal law to use a cell phone in an aircraft.

Nevertheless, our society has grown so accustomed to the use of the cellular phones that aircraft passengers frequently use them illegally in flight. The rules on the ground have been relaxed to the point now that most airlines will allow the use of the cellular phone until the aircraft doors are actually closed. Many passengers assume that this indicates that the rules are just another bit of bureaucracy and are beginning to ignore them in flight with potentially disastrous consequences. Importantly, many passengers simply forget to turn their phones off when they board the plane.

A system is needed for detecting the use of a cellular phone during any time in a flight and immediately giving a location so the crew can take measures to have the cellular phone turned off.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. §1.56(a) exists.

All U.S. patents and applications and all other published documents mentioned anywhere in this application are incorporated herein by reference in their entirety.

Without limiting the scope of the invention, a brief summary of some of the claimed embodiments of the invention is set forth below. Additional details of the summarized embodiments of the invention or additional embodiments of the invention may be found in the Detailed Description of the Invention below.

A brief abstract of the technical disclosure in the specification is provided for the purposes of complying with 37 C.F.R. §1.72.

BRIEF SUMMARY OF THE INVENTION

In at least one embodiment, the invention is directed to a method of locating a cellular phone on an aircraft comprising detecting a cellular phone transmission of a passenger on an aircraft, logging a subscriber number and a serial number of the phone, transmitting the subscriber number and the serial number of the phone to a common carrier for caller identification information, attempting to match the caller identification information with a database, displaying a name and a seat number of the passenger if a match was found between the caller identification information and the database, and recording all information related to the cellular phone transmission.

In some embodiments, the invention is directed to a method of preventing terrorism comprising detecting a cellular phone transmission in an airport, logging a subscriber number and a serial number of the phone, transmitting the subscriber number and the serial number of the phone to a common carrier for caller identification information, attempting to match the caller identification information with either a reservation database or a check-in database, and a terrorist watch list database, displaying a name and a flight number of a passenger if a match was found between the caller identification information and with either the reservation database or the check-in database, and a terrorist watch list database, and recording all information related to the cellular phone transmission.

In at least one embodiment, the present invention is directed towards a method of preventing terrorism comprising detecting a cellular phone transmission in an airport, determining the location of the phone receiving the cellular phone transmission, listening in on the call if the location of the phone receiving the cellular phone transmission is reasonably believed to be outside the United States, and recording the call if the location of the phone receiving the cellular phone transmission is reasonably believed to be outside the United States.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE SEVERAL VIEWS OF THE DRAWING(S)

A detailed description of the invention is hereafter described with specific reference being made to the drawings.

DETAILED DESCRIPTION OF THE INVENTION

Figure 1:
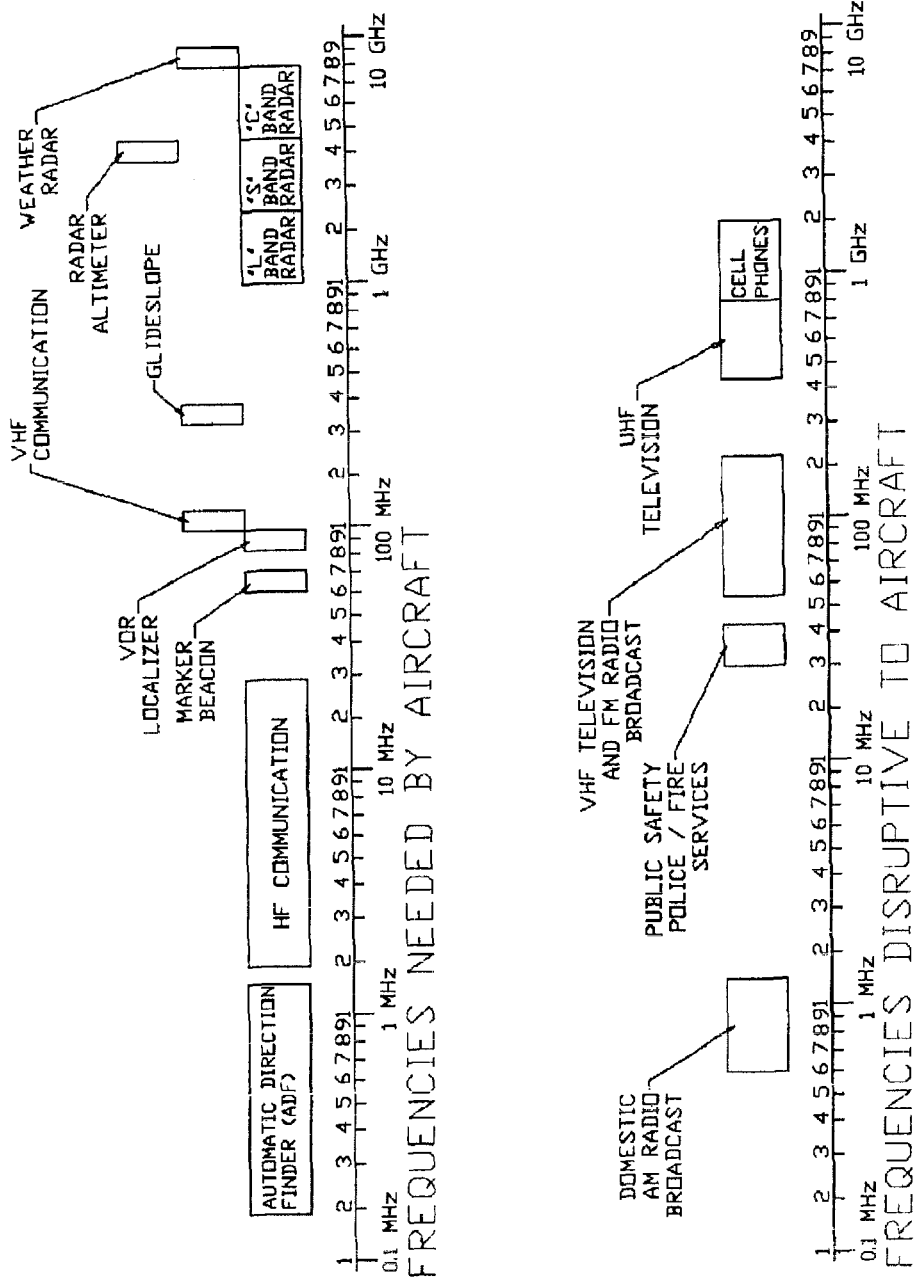
FIG. 1 shows the typical frequencies of aircraft electronics (avionics) and potential interfering offenders.

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

FIG. 1 shows the basic frequencies used in communication systems for cellular phones and the frequencies used for aircraft communication and navigation systems. It can be seen that there are many opportunities for interference.

Figure 2:
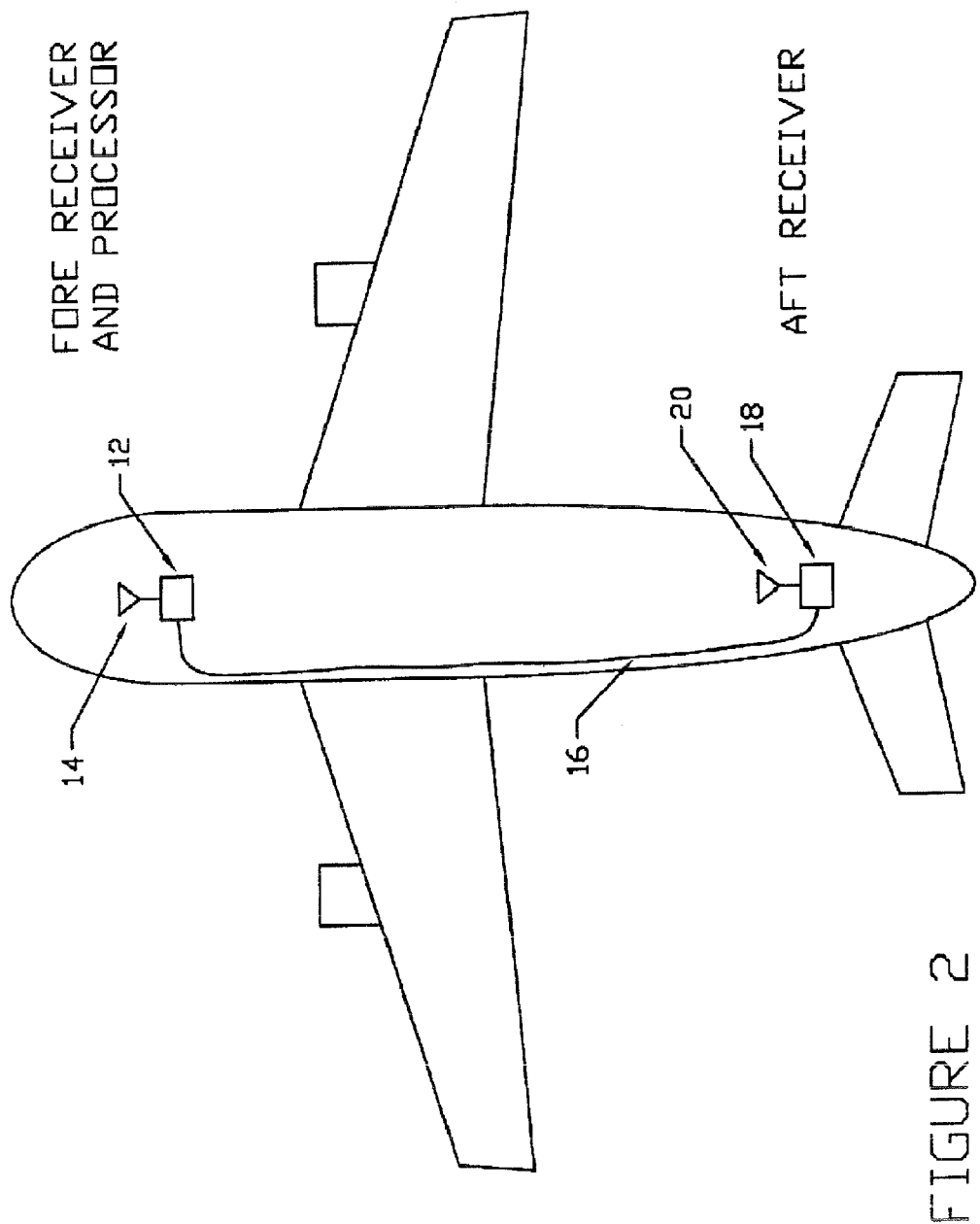
FIG. 2 shows the basic schematics of the system in an aircraft.

FIG. 2 shows the basic schematic of the system in an aircraft. The aircraft 10 has a receiver in the fore (front) of the aircraft 12 and processor system connected to antenna 14. The aft (back) receiver 18 is connected to antenna 20 and transmits its signal through a high-speed cable 16 to the fore receiver and processor for location processing.

Figure 3:
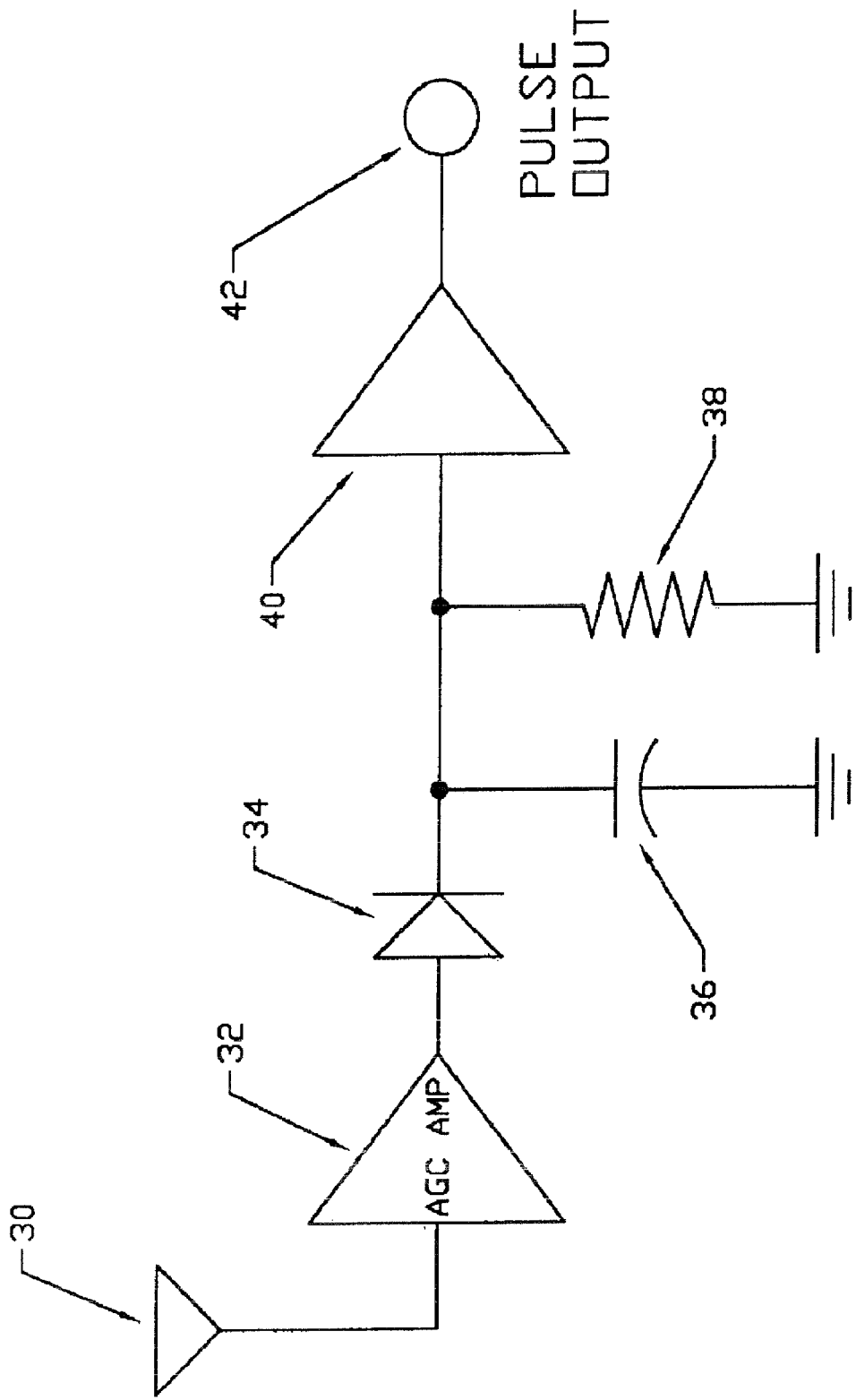
FIG. 3 shows the basic schematics of the receiver for the system.

The basic analog system is shown in the receiver shown in FIG. 3. Here antenna 30 transmits the radio frequency signal to amplifier 32, which increases the gain to give a signal of at least 1 volt amplitude output. That signal is rectified by diode 34 and demodulated with a combination of diode 34 and capacitor 36 and resistor 38. That demodulated signal is then amplified by amplifier 40 and delivered as a pulse output on node 42.

Figure 4A:
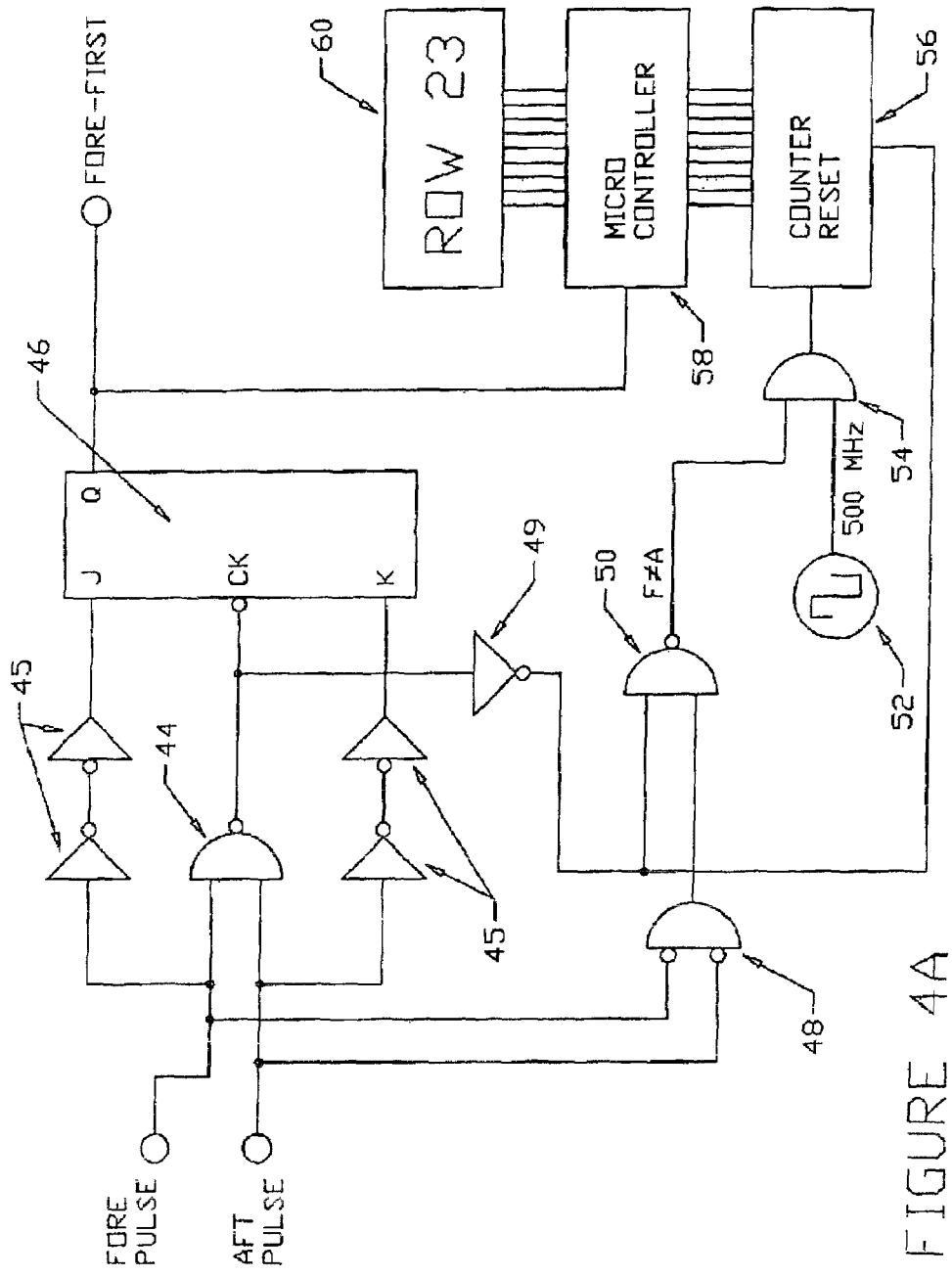
FIG. 4 shows the basic schematics of the digital circuitry of the system.
Figure 4B:
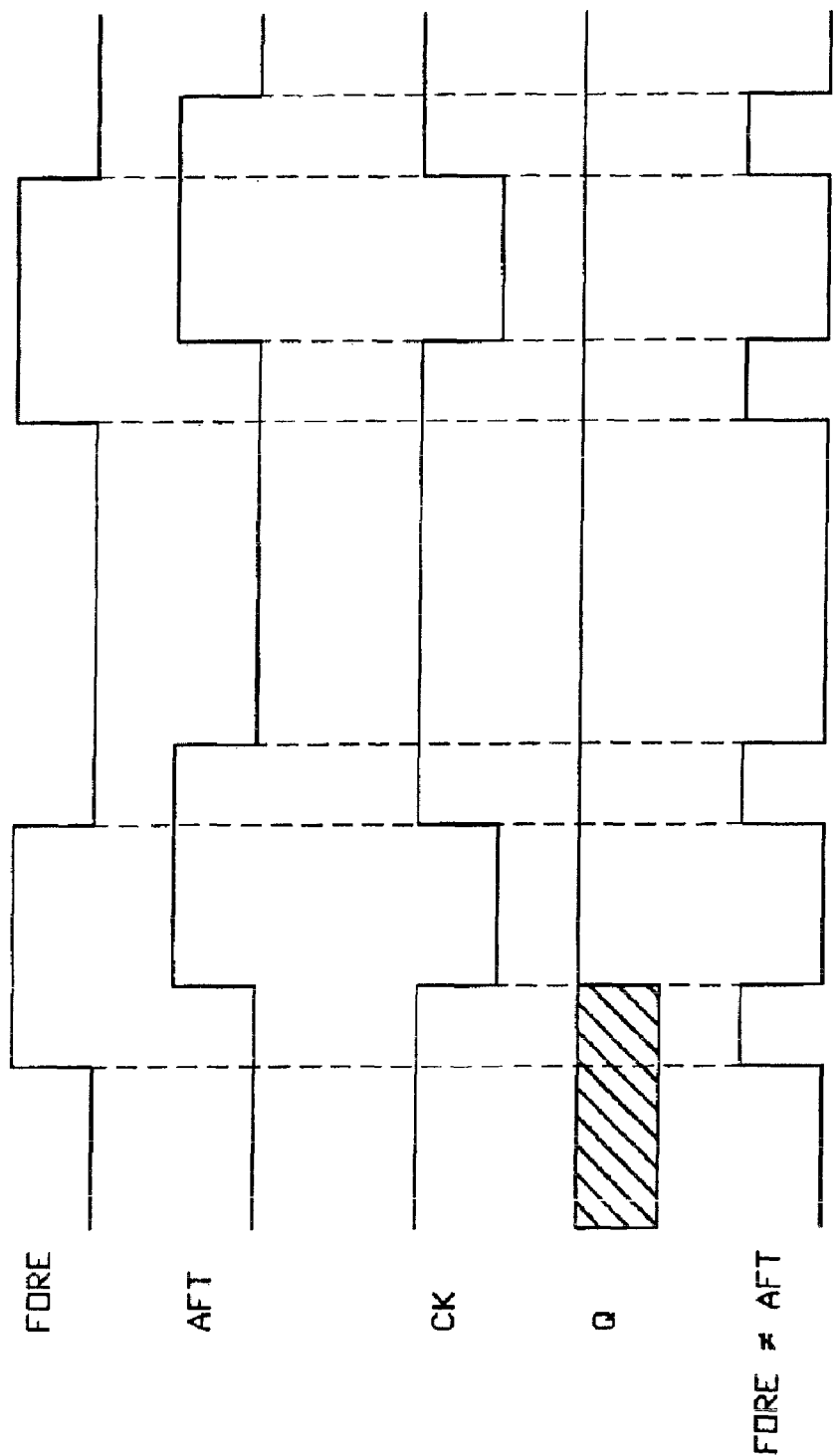

That pulse output is fed to the digital subsystem shown in FIG. 4a. That basic strategy is to see whether the fore pulse or aft pulse comes first with high precision in order to locate the row that the offending cellular phone is in. This is done with a digital circuitry shown in FIG. 4a. The fore pulse and aft pulse feed nor gate 44 and the fore pulse and aft pulse come into nand gate 44 so that when both pulses are high a low clock signal is generated. The fore pulse and aft pulse are also delayed through inverters 45 so that they will appear at the J and K inputs of flip-flop 46 slightly after the clock pulse appears. As seen in FIG. 4b this results in a Q output of the flip-flop 46 being high when the fore pulse arrives first. This is the key for the circuit's ability to recognize which antenna the cellular phone is closest to. Since electromagnetic waves travel at approximately one foot per nanosecond, this information can be used to calculate the relative distance from the cellular phone to aircraft antennas. The fore and aft signals also go into negative input nand gate 48 and then join into the nor gate 50 with the inverted clock signal through inverter 49. This generates a signal fore-not-equal-to-aft which means that the one antenna has received a cellular phone pulse but the other antenna has not yet received it. That fore-not-equal-to-aft signal is anded with a 500 MHz oscillator 52 through nand gate 54. This signal is fed into counter 56. This counter is reset with every pulse out of the inverted clock line from inverter 49 to continuously measure the difference in arrival time between the two antennas. The calculation is very straightforward. If the fore pulse arrives six clock signals before the aft pulse that means that it arrives 12 nanoseconds earlier. That meant that the cellular phone is 12 feet closer to the fore antenna than it is the aft antenna. That means that the cellular phone is about six feet in front of the center of the aircraft. In this case, the center of the aircraft is defined as the midpoint between the fore and aft detection antennas. A resolution of one or two feet is certainly sufficient to locate the row of the offending cellular phone. The output of the counter is then fed to micro controller 58 which calculates the location in feet from the center of the plane then calculates, based on its data base of seat positions, the exact row the cellular phone is located in. This is displayed in display 60.

Figure 5:
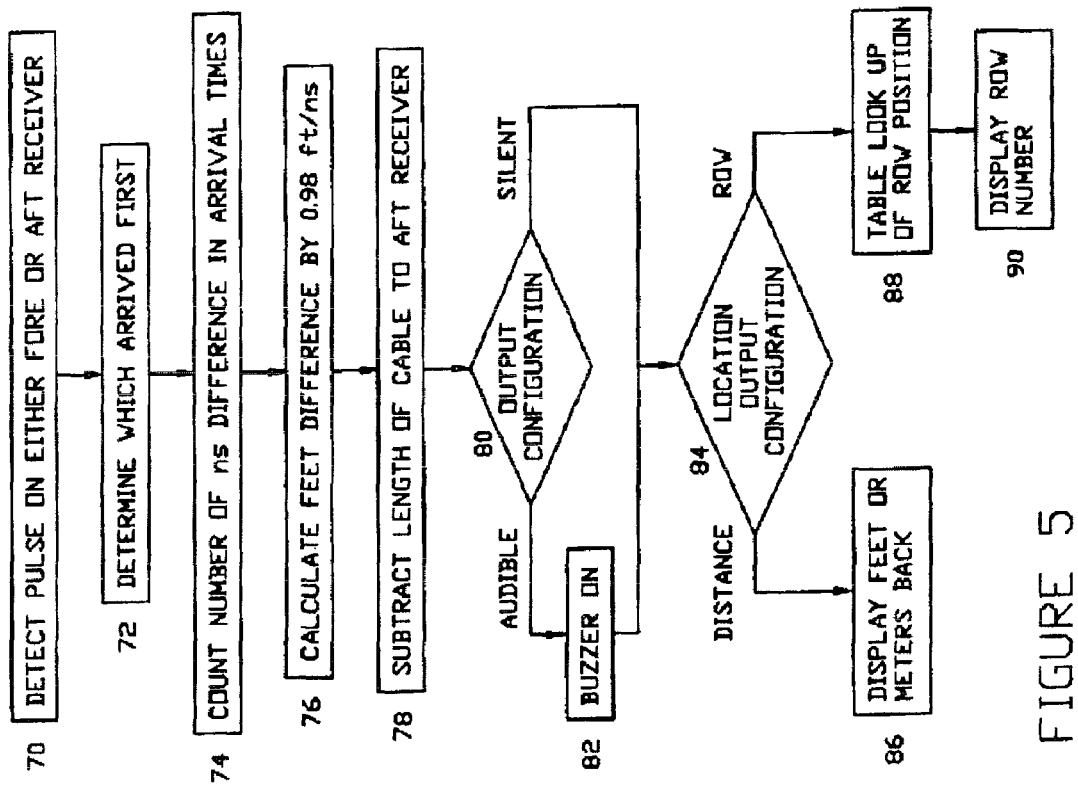
FIG. 5 shows the basic method of the invention.

The method of the embodiment of this invention is shown in FIG. 5. In step 70 the system detects a pulse on either the fore or aft receiver and then in step 72 determines which arrives first. In step 74 the system counts the number of nanoseconds difference in arrival times.

In step 76 the feet difference is calculated by the division of 0.98 feet per nanosecond. In step 78 the system will subtract the length of the cable to the aft receiver. This is an important correction in that the signal from the aft receiver will always appear at least "100 feet" or 100 nanoseconds later than the fore receiver since the aft pulse must travel up the cable. This is a simple subtraction that can be performed by the micro controller shown as circuit 58 in FIG. 4a.

The system then looks at the output configuration in decision step 80. If the system is set up for silent operation then it goes on to step 84. If it is set up for audible operation then it will trigger a buzzer in step 82 to alert the flight attendants that there is a cell phone in use in the aircraft.

In step 84 the decision is made as far as the location output configuration. If distance was set then the system goes to step 86 and will display the distance in feet or meters from the back of the plane or from any other desired landmark. If row location was selected in step 88 then the system will look up row positions and then in step 90 display the exact row number.

Figure 6:
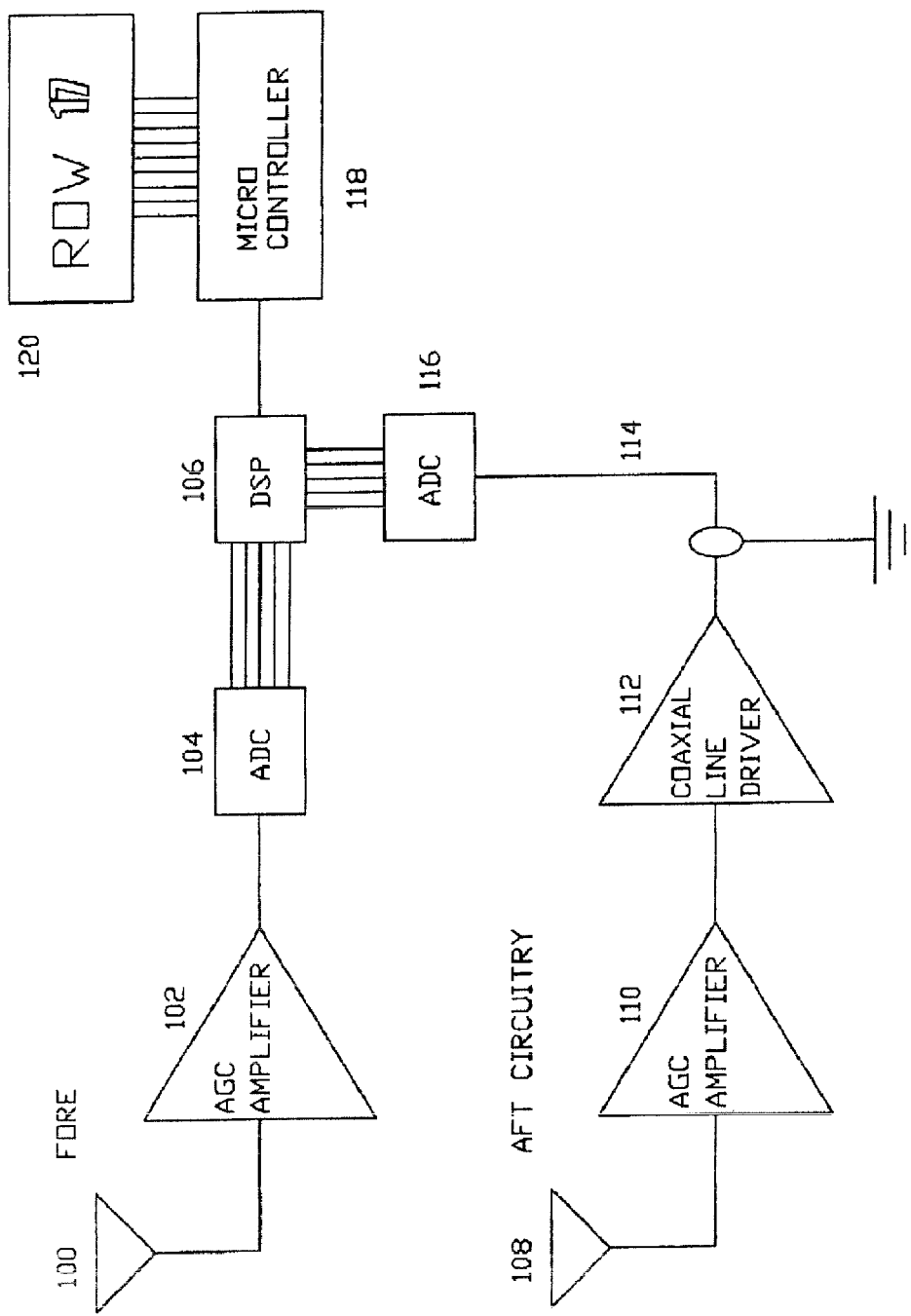
FIG. 6 shows the basic circuitry for the laptop computer detection embodiment of the invention.

FIG. 6 shows a continuous correlation scheme that would be necessary for use with detection of laptop computer broad band emissions. Since cellular phones operate on a pulse train they are easily located with the circuit in FIG. 4a. For example the pulses shown in FIG. 4b for a United States digital system such as IS-54-b would show a pulse of 33.3% duty cycle as three users could be on a single channel. Some more modern systems such as the New American IS-95-a and the European GSM standard transmit with a 12.5% duty cycle. Thus the pulse would be high ⅛th of the time.

Unfortunately the simple scheme of FIGS. 4a and 4b will not work for the continuous broad band noise of the laptop like it would for the digitally pulsed cellular phone in FIG. 6 shows the fore antenna 100 feeding an AGC (automatic gain control) to amplifier 102 which then feeds into an analog to digital converter in box 104. That is then fed into a digital signal process (DSP) circuit which will process that information along with that from the aft circuitry.

The aft circuitry involves an antenna 108 feeding into an AGC amplifier 110 which then feeds into a coaxial line driver 112 that drives the high frequency signal down the coaxial cable 114 up to the ADC in the fore system 116. Those two now digital signals are mixed in the DSP 106 for a calculation of arrival time difference through a correlation analysis. That is then passed on to the micro controller 118 to locate the offending broad band signal source which typically will be a laptop computer. That is then passed to the display 120 to show the row location of the offender.

Figure 7:
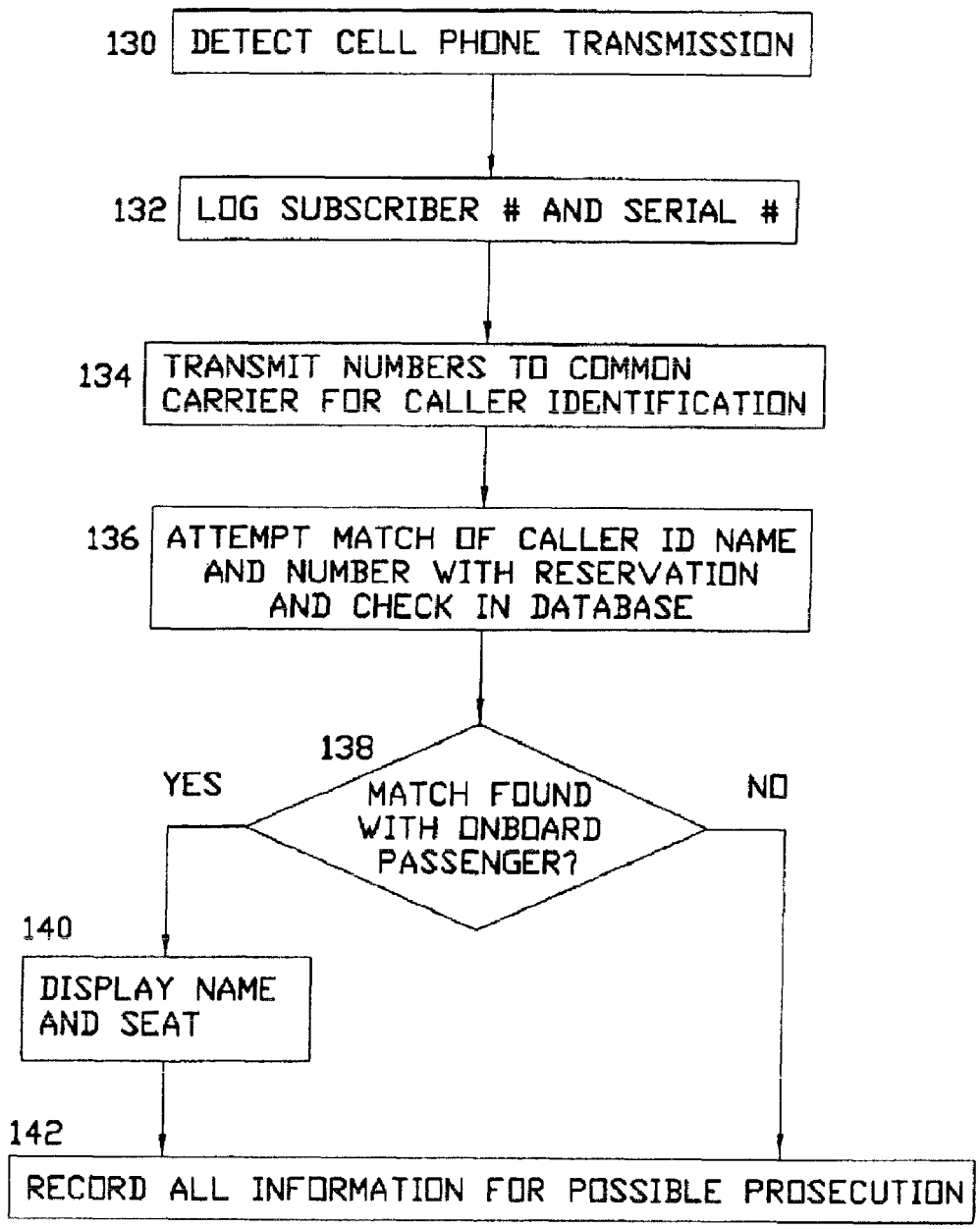
FIG. 7 shows the flow chart for the embodiment of the invention using data base matches to identify the offending user.

FIG. 7 shows the method of an alternative and adjunctive embodiment for this invention. Step 130 of the system will detect a cellular phone transmission. In step 132 it will log the subscriber and serial number. More information related to cellular phones can be found in U.S. patent application Ser. No. 10/219,901, the entire contents of which is incorporated herein by reference. In step 134 those numbers will be transmitted down to the ground to a common carrier for a caller identification attempt.

In step 136 an airline system will attempt to match the caller id with a name and number with a reservation and check-in database. At decision 138 the system will see if it was able to make a plausible match with an on-board passenger. If the answer is "no" then the method just goes on to step 142 to record information for a possible later prosecution. If a match is found in step 138 then it goes on to step 140 to display the name and the seat location of the passenger to the flight attendants for immediate interaction.

Another embodiment involves the addition of a signal strength meter on the output of amplifier FIG. 3. This could be easily made in a small battery operated hand-held system and a flight attendant could carry this down the aisle either openly or surreptitiously to get the strongest signal to identify the offending passenger.

Figure 12:
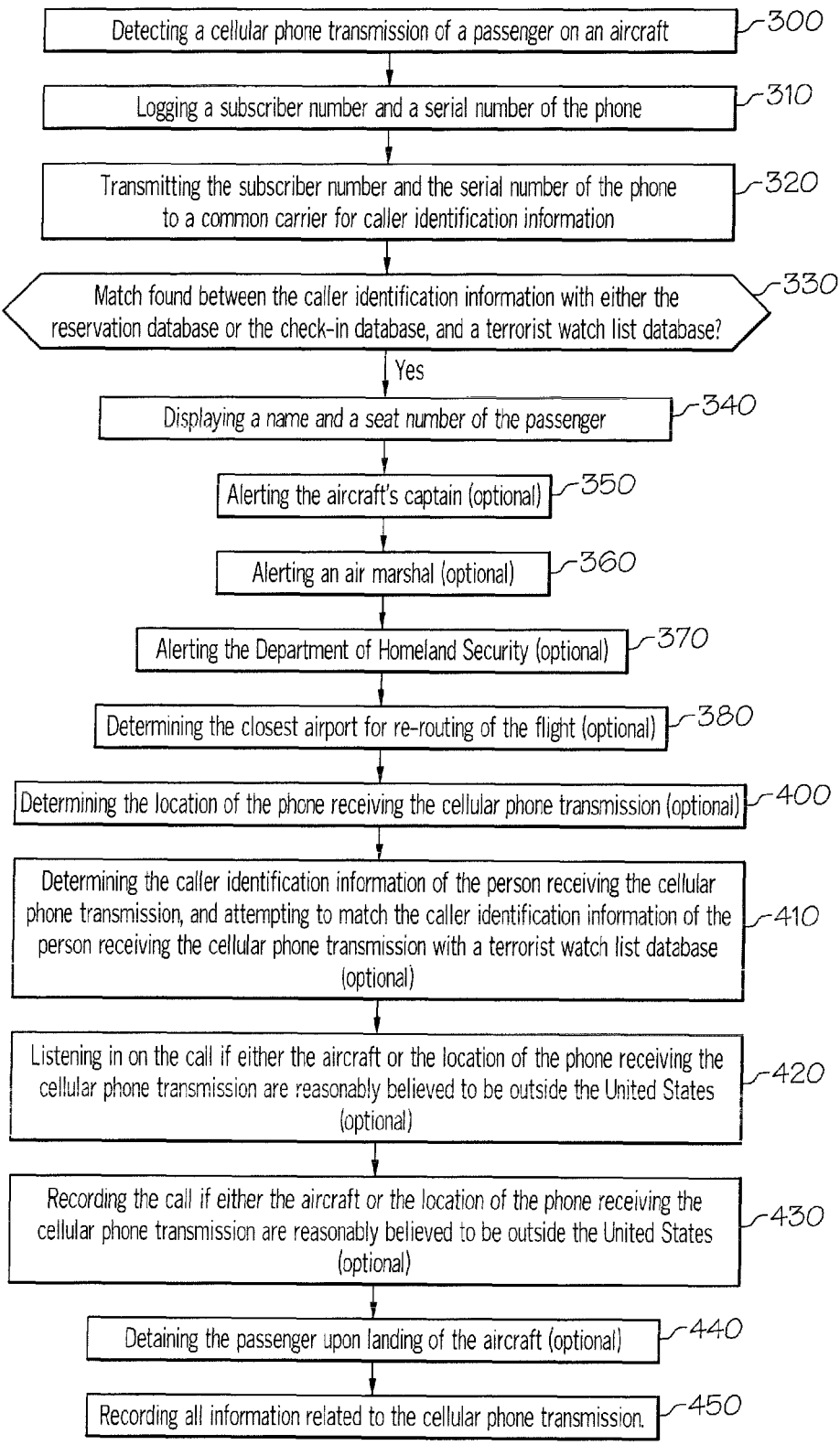
FIG. 12 shows the flow chart for an embodiment of the invention using data base matches to identify a cell phone user an aircraft.

Another embodiment of the invention is depicted in FIG. 12. Like in FIG. 7, the method begins with detecting a cellular phone transmission of a passenger on an aircraft, shown at 300, logging a subscriber number and serial number of the phone, shown at 310, and then transmitting the subscriber number and serial number to a common carrier for caller identification, shown at 320. It should be noted that in FIGS. 12-14, the step of detecting the cellular phone transmission may replaced by, or used in conjunction with, detecting the registration of the cellular phone, or detecting the channel maintenance output, and any combination thereof. Next, at 330 an attempt is made to match the caller's identification information with names in several databases: a reservation database or check-in database, and a terrorist watch list database. Comparing names against the terrorist watch list is often done at the time a passenger checks in. However, a potential terrorist may be clever enough to use an alias when purchasing the ticket and checking in for the flight. Comparing the caller id against the terrorist watch list database allows a second opportunity to expose the passenger. If a match is found, the name and seat number of the passenger is displayed, shown at 340. Next, information related to the call is recorded, as seen at 450.

There are several optional steps available if there is a match between the caller's identification information and the terrorist watch list database. The aircraft's captain may be alerted to the fact that a passenger whose identity matches a name on a terrorist watch list database is using a cellular phone on the aircraft (350). And, an air marshal may be alerted to the fact that a passenger whose identity matches a name on a terrorist watch list database is using a cellular phone on the aircraft (360). Additionally, a representative from the Department of Homeland Security may be alerted (350). It should be noted that these options are not mutually exclusive—all or only some of these actions may be performed.

If there is a match between the caller identification information of the either the person transmitting the call or the person receiving the call and the terrorist watch list database, another option include determining the closest airport for re-routing of the flight (380). Whether the flight is diverted or proceeds to its scheduled destination, the method may also include detaining the passenger for questioning upon landing of the aircraft (440).

Another optional step is available if there is a match between the caller's identification information and the terrorist watch list database: determining the location of the phone that is receiving the cellular phone transmission (400). The procedure for determining the location of the phone receiving the cellular phone transmission is used for billing purposes and as such is well known and need not be described in detail. Another optional step, shown at 410, includes determining the caller identification information of the person receiving the cellular phone transmission, and attempting to match the caller identification information of the person receiving the cellular phone transmission with a terrorist watch list database. If the location of the person receiving the call is determined to be outside of the US, or if the aircraft itself is outside the US, the method may further include listening in on the call, shown at 420. Additionally, the method may include recording the call for later review and analysis by the National Security Agency (450).

Figure 13:
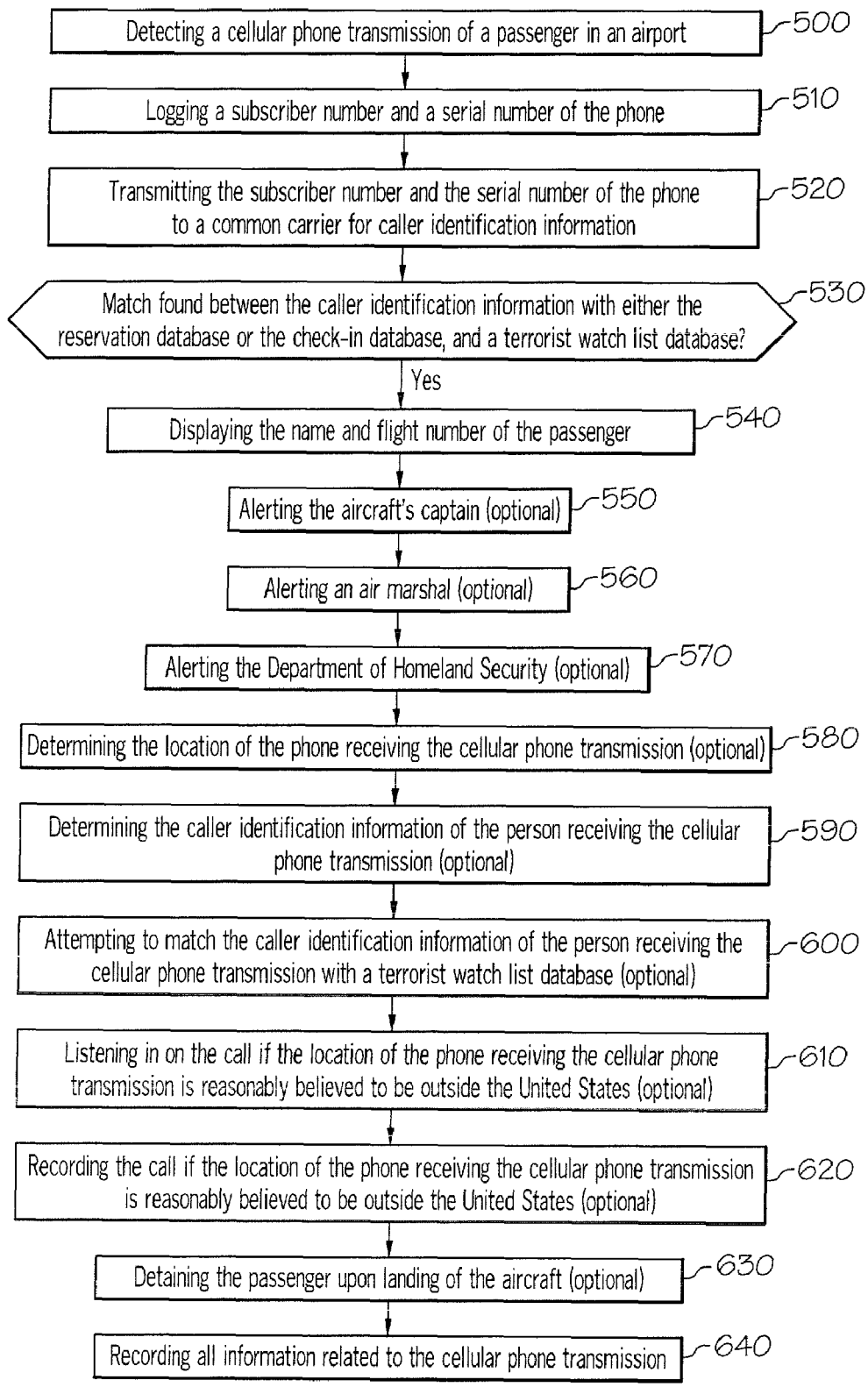
FIG. 13 shows the flow chart for an embodiment of the invention using data base matches to identify a cell phone user an airport.
Figure 14:
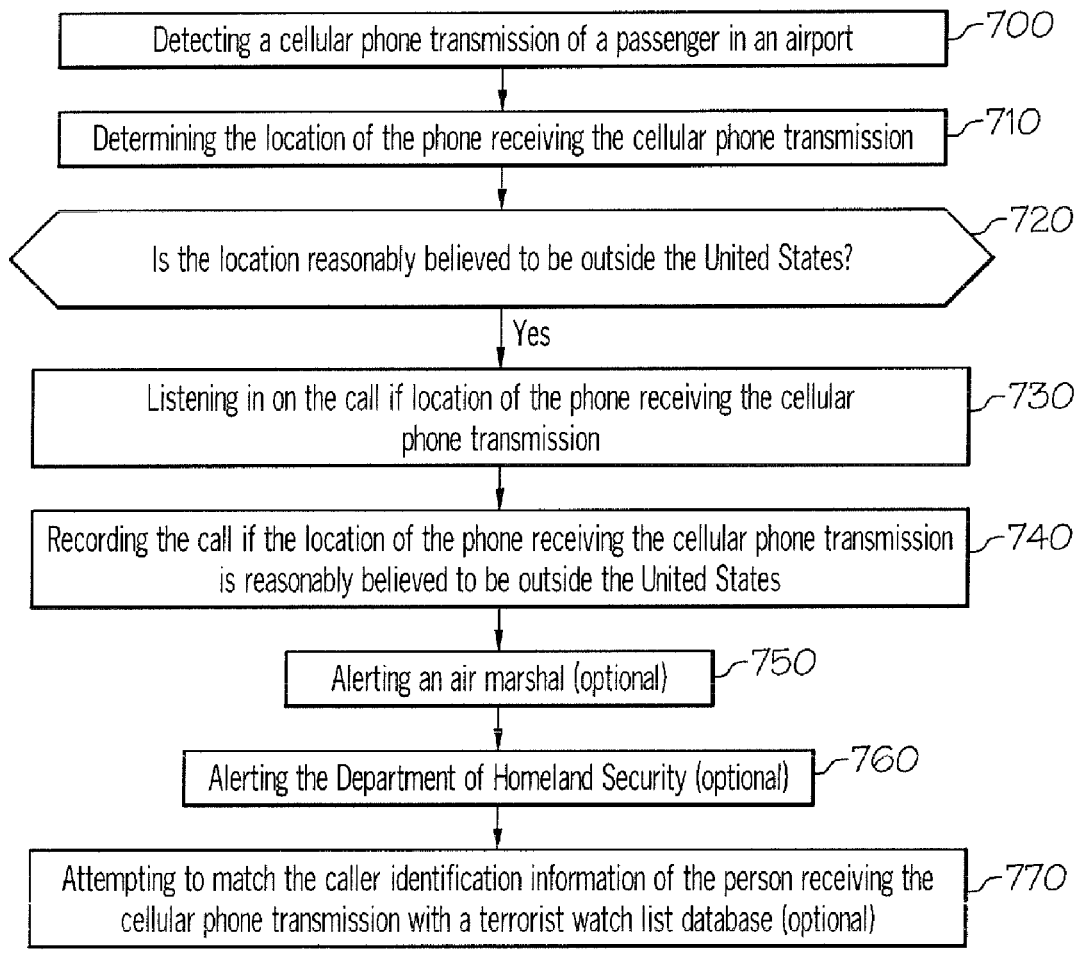
FIG. 14 shows the flow chart for an embodiment of the invention using data base matches to identify a cell phone user outside of the United States.

While some embodiments may be directed towards cellular phone transmission of passengers that are already on an aircraft, as described above, another embodiment is directed towards persons that are within an airport, as seen in FIGS. 13-14. Referring specifically to FIG. 13, in such a method of preventing terrorism, the method includes detecting a cellular phone transmission in an airport (500); determining the person's location within the airport is not necessary. Next, the subscriber number and the serial number of the phone can be logged (510), and then transmitted to a common carrier for caller identification information (520). The method further includes attempting to match the caller identification information with either a reservation database or a check-in database, and a terrorist watch list database (530). If a match is found between the caller identification and the reservation or check-in database and a terrorist watch list database, the method then includes displaying the name and the flight number of the passenger (540). All information related to the cellular phone transmission is then recorded for later use by the Department of Homeland Security, for example (640).

If there is a match with the terrorist watch list database, the method may optionally include alerting the aircraft's captain (550), alerting an air marshal (560), and alerting a representative from the Department of Homeland Security (570) that a person in the airport using a cell phone is on a terrorist watch list.

If there is a match with the terrorist watch list database, the method may also optionally include determining the location of the phone receiving the cellular phone transmission (580). Thus, the method can further include listening in on the call if the location of the phone receiving the cellular phone transmission is reasonably believed to be outside the United States (610). The method can further include recording the call if the location of the phone receiving the cellular phone transmission is reasonably believed to be outside the United States (620). If there is a match between the terrorist watch list database, the Department of Homeland Security may be contacted.

If there is a match with the terrorist watch list database, it may also be desirable to attempt to determine the caller identification information of the person receiving the cellular phone transmission (590) and attempt to match the caller identification information of the person receiving the cellular phone transmission with a terrorist watch list database (600).

Referring now to FIG. 14, the method may focus primarily on the person receiving the cellular phone call of the person in the airport. The method includes detecting a cellular phone transmission of a passenger in an airport (700) and determining the location of the phone receiving the cellular phone transmission (710). If the location is reasonably believed to be outside the United States (720), then the method includes listening in on the call (730) and recording the call (740). As described earlier, there are a number of optional steps, in particular alerting an air marshal (750), alerting the Department of Homeland Security (760), and attempting to match the caller identification information of the person receiving the cellular phone transmission with a terrorist watch list database (770).

Figure 8:
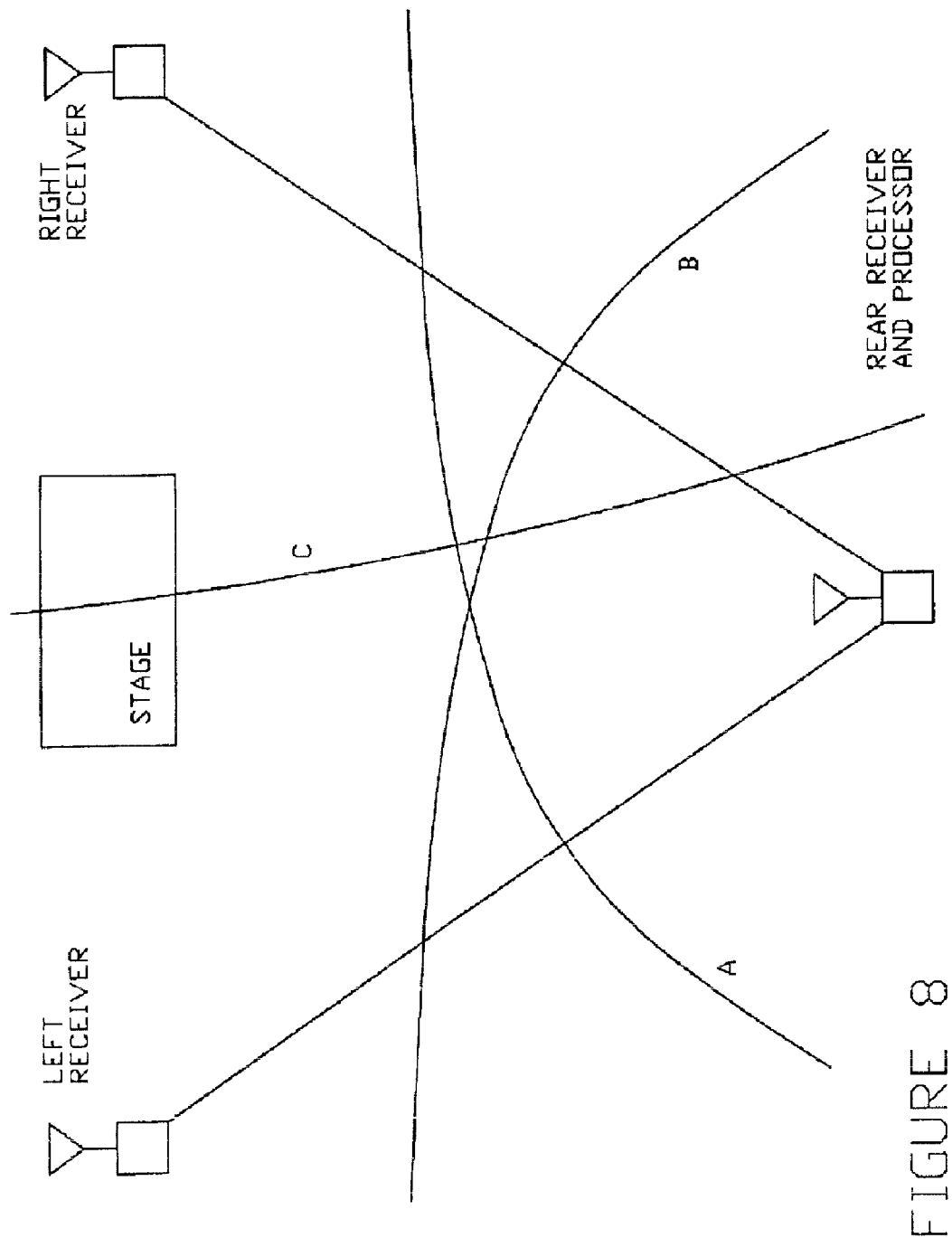
FIG. 8 shows the method of using arrival times in a theater.

FIG. 8 shows the use of the invention to locate a cellular phone in a theatre. Cell phone calls in audiences are a highly irritating nuisance and should be detected before a performance begins. Because the universe of locations is now two dimensional (instead of one for airplanes) the system uses three receivers. The time of arrival differences give hyperbolas for potential location loci. For example, when the Rear Receiver 130 receives the cell phone signal before the Left Receiver 132, then the phone will be found on a hyperbola such as that depicted by curve A. Similarly the Right Receiver 134 generates curves B and C in concert with the other two receivers. The intersection of curves A, B, and C gives an accurate location of the offending cell phone.

Figure 9:
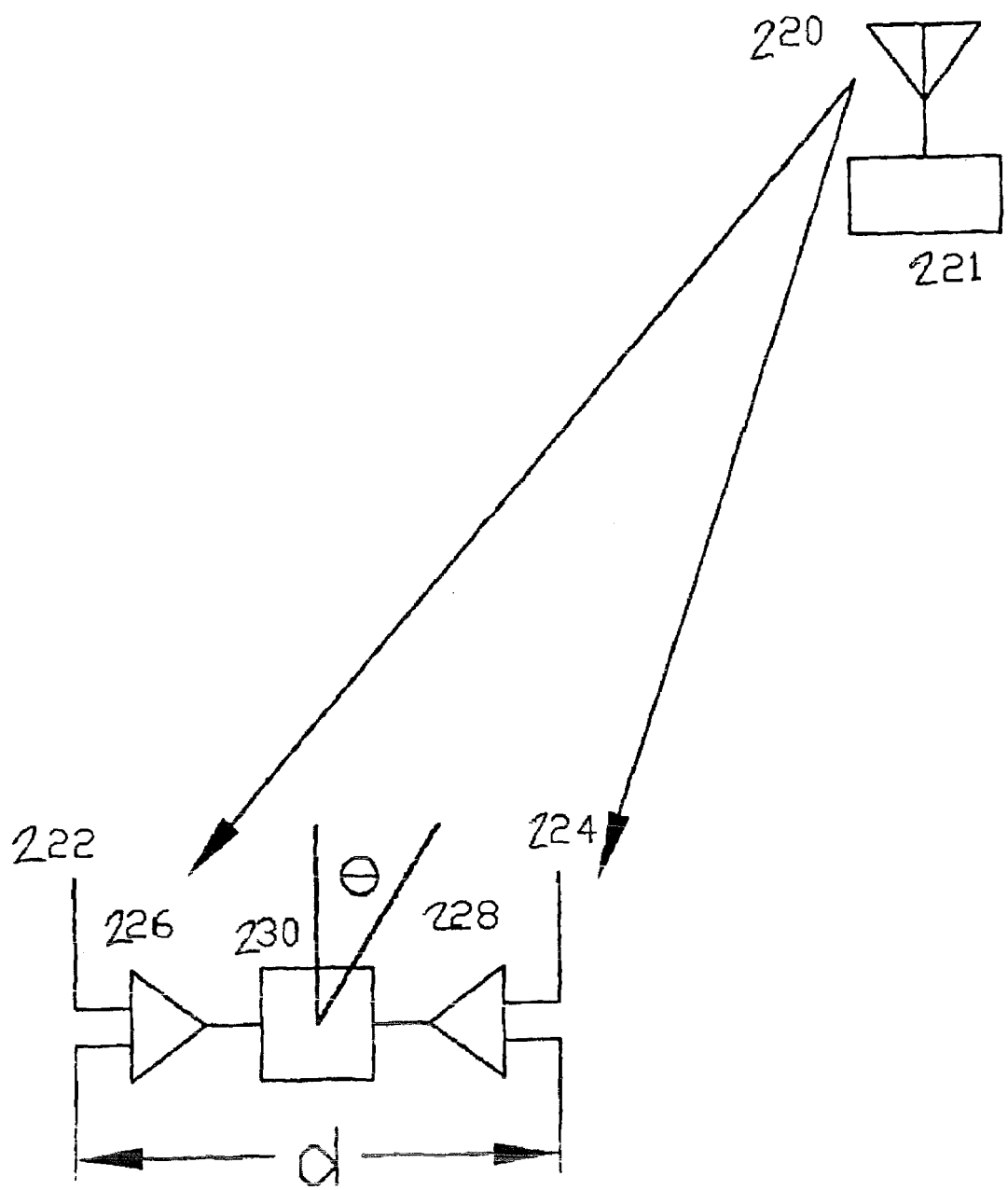
FIG. 9 shows the schematic of the bearing angle calculation system.

FIG. 9 shows another embodiment of the invention. The cell phone 221 transmits a signal out of its antenna 220 along the vectors shown to a first locator unit. These are received by the left dipole antenna 222 and right dipole antenna 224. The signals are fed, respectively, through high frequency amplifiers 226 and 228 to the main circuitry 230. The spacing d is ideally about 8 cm to allow the antenna to fit into a small unobtrusive unit. However, spacings from 4 cm out to 200 cm would function adequately.

The primary frequencies for cell phones transmission (the base stations use different frequencies) include the 824-849 MHz (for the USA AMPS system) and approximately 1.8 GHz and 1.9 GHz for other systems. High frequency amplifiers are available from a number of sources including Maxim of Sunnyvale, Calif., Phillips Semi-Conductors of Sunnyvale, Calif., and Celeritek of Santa Clara, Calif.

To understand the operation of the invention the following simple algebra is required.
Assume:

| | |
|---|---|
| $c =$ | speed of light |
| $f =$ | frequency of the cell phone |
| $d =$ | 8 cm |
| $\Delta =$ | $d \cos \theta$ cm where $\Delta$ is the increase in distance to the furthest antenna |
| $t =$ | $\Delta/c = d \cos \theta/c$ seconds where t is the arrival time difference |
| $p =$ | $1/f$ seconds where p is the period of the cell phone RF signal |
| $\phi =$ | $360 \ t/p = 360 \ f \ d \cos \theta/c$ gives the phase between the 2 antennas |
| $\cos \theta = \left[ \dfrac{c\phi}{360 fd} \right]$ | relates the bearing to the phase difference |

And finally the bearing in degrees to the transmitter is given by:

$$\theta = \arccos \ [c\phi/360 fd]$$

For an example:
To use round numbers, assume the cell phone is using the frequency of 900 MHz and the locator antennas have a spacing d of 8 cm. If the cell phone is at a bearing angle $\theta$ of 45° from the main axis of the locator unit then:

| | |
|---|---|
| $\Delta =$ | $d \cos 45°$ |
| $\Delta =$ | 5.66 cm |
| $t =$ | 0.189 ns |
| $p =$ | 1.11 nm |
| $\phi$ (phase delay) = | 61° |

All that the locator unit would "know" are the antenna spacing "d", the frequency "f" of the transmission, the speed of light "c", and the detected phase delay, "$\phi$".
Plugging those numbers into the equation for $\theta$ gives:

$$\theta = \arccos \left[ \frac{3 \cdot 10^8 \text{ cm/s} \cdot 61°}{360° \cdot 900 \text{ MHz} \cdot 8 \text{ cm}} \right] = 45°$$

Other direction finding techniques may be applied to find the bearing angle. Such techniques are taught in many textbooks including "Small-Aperture Radio Direction Finding" by Herndon H. Jenkins published in 1991 by Artech House in Boston and London. This textbook teaches many direction finding techniques including amplitude response, phase differential-to-amplitude response, phase interferometry, and pseudodoppler. This invention encompasses the possible use of these other techniques.

Figure 10:
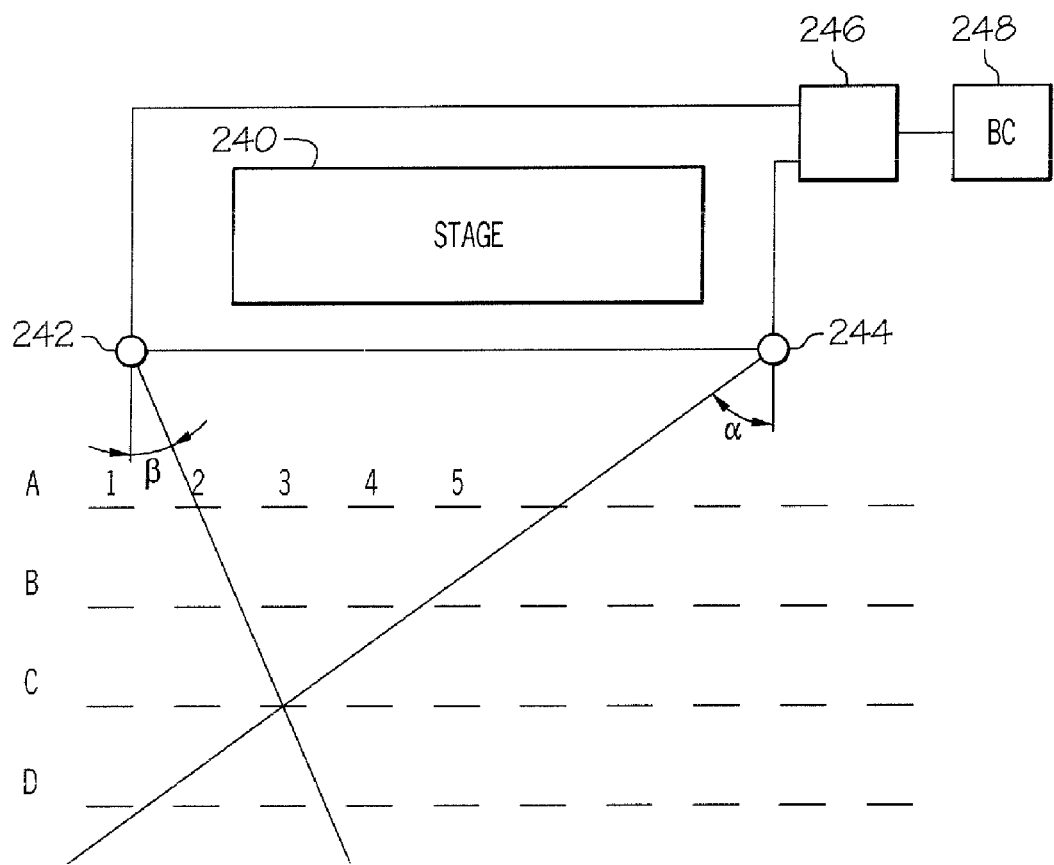
FIG. 10 shows the use of the bearing angle method in use in a theater.

FIG. 10 shows the use of these locator units to "triangulate" to the offending cell phone. Direction finding units 242 and 244 are located in front of a theatre on each side of the stage 240. Their outputs connect to the controller unit 246 which has the processor to convert the angles-of-origin into an intersection point and the seat location memory to calculate the offending seat position. Display 248 which is readable by the security force shows the seat number. Display 248 is connected to the controller by cable, infrared, or an RF link. Optionally, the display is large and visible to the audience. Someone in seat 3C has their cell phone on, in contravention of the business rules or even of ordinance. Locator 244 sees the cell phone at a bearing of a degrees while locator 242 sees the offender at bearing b degrees. By use of the prestored map of the theatre, the intersection is immediately seen to be seat 3C.

Figure 11:
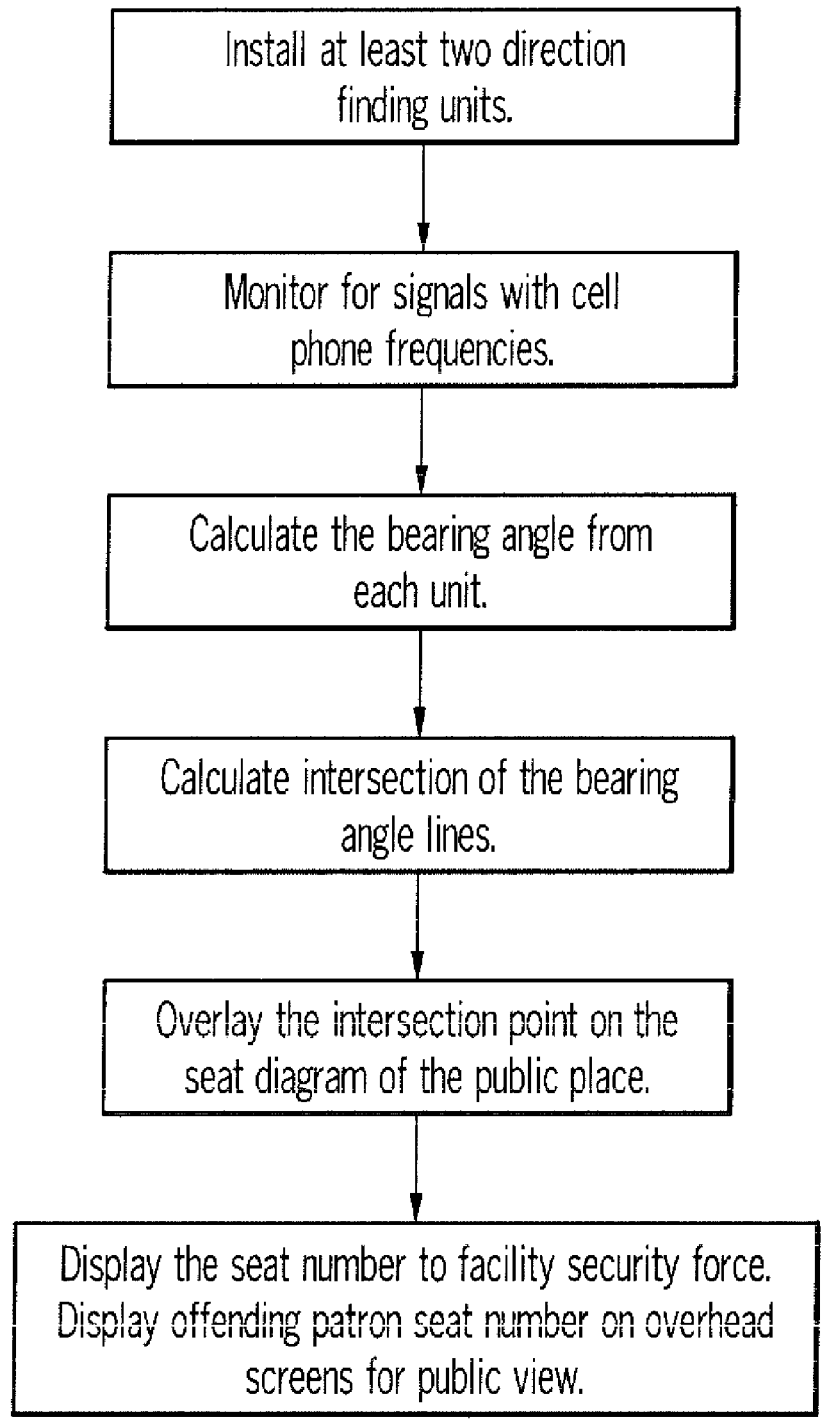
FIG. 11 shows the steps of the bearing angle method for theater use.

FIG. 11 shows the method of the bearing angle location applied to a theater or other public place. The seat numbering system is overlaid plotted out so that each seat has a precise X-Y coordinate in a local grid. The first step is to install at least two direction finding units. The X-Y locations of these units are also stored for further calculations. Then the system must monitor for signals with cell phone frequencies. It will then calculate the bearing angle (often referred to as the angle-of-origin) from each unit. Lines are then drawn out from the unit along these angles. It will then calculate intersection of these bearing angle (or angle-of-origin) lines. This intersection is then overlayed onto the seat diagram of the public place. The system will then display the seat number to facility security force. It can also, by operator control, display the offending patron seat number on overhead screens for public view.

This system is also adaptable to 3-dimensional seating as is seen in stadiums or theaters of balconies.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of locating a cellular phone on an aircraft, the method comprising:
   detecting a cellular phone transmission of a passenger on an aircraft;
   logging a subscriber number and a serial number of the phone;
   transmitting the subscriber number and the serial number of the phone to a common carrier for caller identification information;
   attempting to match the caller identification information with a database;
   displaying a name and a seat number of the passenger if a match was found between the caller identification information and the database; and
   recording all information related to the cellular phone transmission.

2. The method of claim 1, wherein the attempting to match with a database further comprises attempting to match with an airline check-in database.

3. The method of claim 2, wherein the attempting to match with a database further comprises attempting to match the caller identification information with a terrorist watch list database.

4. The method of claim 3, further comprising:
   alerting the aircraft's captain if there is a match between the caller identification information and the terrorist watch list database.

5. The method of claim 3, further comprising:
   alerting an air marshal if there is a match between the caller identification information and the terrorist watch list database.

6. The method of claim 3, further comprising:
   determining the location of the phone receiving the cellular phone transmission; and
   listening in on the call if either the aircraft or the location of the phone receiving the cellular phone transmission are reasonably believed to be outside the United States.

7. The method of claim 3, further comprising:
   recording the call if either the aircraft or the location of the phone receiving the cellular phone transmission are reasonably believed to be outside the United States.

8. The method of claim 3, further comprising:
   alerting the Department of Homeland Security if there is a match between the caller identification information and the terrorist watch list database.

9. The method of claim 3, further comprising:
   determining the closest airport for re-routing of the flight if there is a match between the caller identification information and the terrorist watch list database.

10. The method of claim 3, further comprising:
    determining the location of the phone receiving the cellular phone transmission.

11. The method of claim 10, further comprising:
    determining the caller identification information of the person receiving the cellular phone transmission; and
    attempting to match the caller identification information of the person receiving the cellular phone transmission with a terrorist watch list database.

12. The method of claim 11, further comprising:
    alerting the Department of Homeland Security if there is a match between the caller identification information and the terrorist watch list database.

13. The method of claim 12, further comprising:
    detaining the passenger upon landing of the aircraft.

14. A method of preventing terrorism, the method comprising:
    detecting a cellular phone transmission in an airport;
    logging a subscriber number and a serial number of the phone;
    transmitting the subscriber number and the serial number of the phone to a common carrier for caller identification information;
    attempting to match the caller identification information with either a reservation database or a check-in database, and a terrorist watch list database;
    displaying a name and a flight number of a passenger if a match was found between the caller identification information and with either the reservation database or the check-in database, and a terrorist watch list database; and
    recording all information related to the cellular phone transmission.

15. The method of claim 14, further comprising:
    determining the location of the phone receiving the cellular phone transmission.

16. The method of claim 15, further comprising:
    listening in on the call if the location of the phone receiving the cellular phone transmission is reasonably believed to be outside the United States.

17. The method of claim 15, further comprising:
    recording the call if the location of the phone receiving the cellular phone transmission is reasonably believed to be outside the United States.

18. The method of claim 14, further comprising:
    alerting the Department of Homeland Security if there is a match between the caller identification information and the terrorist watch list database.

19. A method of preventing terrorism, the method comprising:
    detecting a cellular phone transmission in an airport;
    determining the location of the phone receiving the cellular phone transmission;
    listening in on the call if the location of the phone receiving the cellular phone transmission is reasonably believed to be outside the United States; and
    recording the call if the location of the phone receiving the cellular phone transmission is reasonably believed to be outside the United States.

* * * * *